US009976678B2

(12) United States Patent
Cowham et al.

(10) Patent No.: US 9,976,678 B2
(45) Date of Patent: May 22, 2018

(54) CLAMP

(71) Applicant: Pridgeon & Clay, Inc., Grand Rapids, MI (US)

(72) Inventors: Gregory S. Cowham, Alto, MI (US); Michael D. Kozal, Caledonia, MI (US); Mathews Goveas, Grand Rapids, MI (US); Daniel J. Bostwick, Grandville, MI (US); Chad D. Ham, Hudsonville, MI (US); Pete R. Wojtas, Grand Rapids, MI (US); William Kanouse, Grand Rapids, MI (US); Brent Piselli, Grand Rapids, MI (US)

(73) Assignee: Pridgeon & Clay, Inc., Grand Rapids, MI (US)

( * ) Notice: Subject to any disclaimer, the term of this patent is extended or adjusted under 35 U.S.C. 154(b) by 0 days. days.

(21) Appl. No.: 15/288,587

(22) Filed: Oct. 7, 2016

(65) Prior Publication Data

US 2017/0211732 A1    Jul. 27, 2017

Related U.S. Application Data

(60) Provisional application No. 62/281,366, filed on Jan. 21, 2016.

(51) Int. Cl.
*F16L 33/04*       (2006.01)
*F16L 21/06*       (2006.01)

(52) U.S. Cl.
CPC .............. *F16L 21/065* (2013.01); *F16L 33/04* (2013.01)

(58) Field of Classification Search
CPC ..... F16L 3/02; F16L 3/08; F16L 33/04; F16L 21/065; Y10T 24/1441; Y10T 24/1443
USPC ................................... 285/367, 410
See application file for complete search history.

(56) References Cited

U.S. PATENT DOCUMENTS

| | | | | |
|---|---|---|---|---|
| 3,510,918 A | * | 5/1970 | Oetiker | F16L 33/025 24/19 |
| 7,231,694 B2 | * | 6/2007 | Ignaczak | F16L 21/065 24/279 |
| 2004/0216284 A1 | * | 11/2004 | Belisle | F16L 21/065 24/279 |
| 2004/0261227 A1 | * | 12/2004 | Cassel | F16L 21/065 24/20 R |
| 2005/0039306 A1 | * | 2/2005 | Logan | F16L 33/04 24/19 |
| 2007/0022578 A1 | * | 2/2007 | Crockett, IV | F16L 33/08 24/274 R |

FOREIGN PATENT DOCUMENTS

WO    WO 8002317 A1 *  10/1980  ............ F16L 21/065

* cited by examiner

*Primary Examiner* — David Bochna
*Assistant Examiner* — James A Linford
(74) *Attorney, Agent, or Firm* — McGarry Bair PC

(57) ABSTRACT

A clamp for use in joining conduit segments comprising a ring sector and a radially projecting channel sector having first and second straps, first and second compression members, a central compression member, and a fastener wherein upon tightening the fastener, axial forces along the fastener are transferred into clamping forces around the clamp in order to seal the conduit segments.

16 Claims, 7 Drawing Sheets

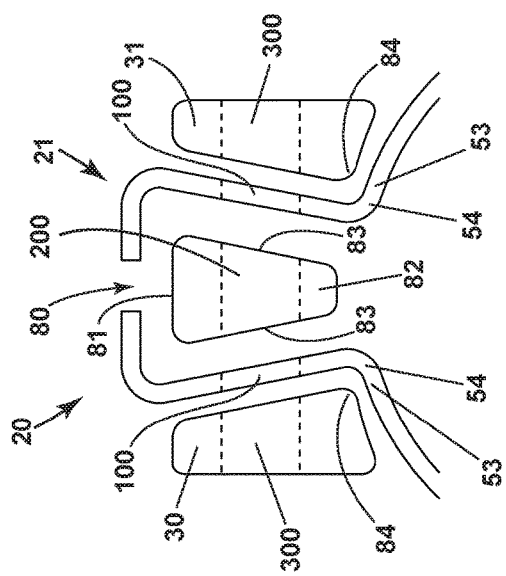
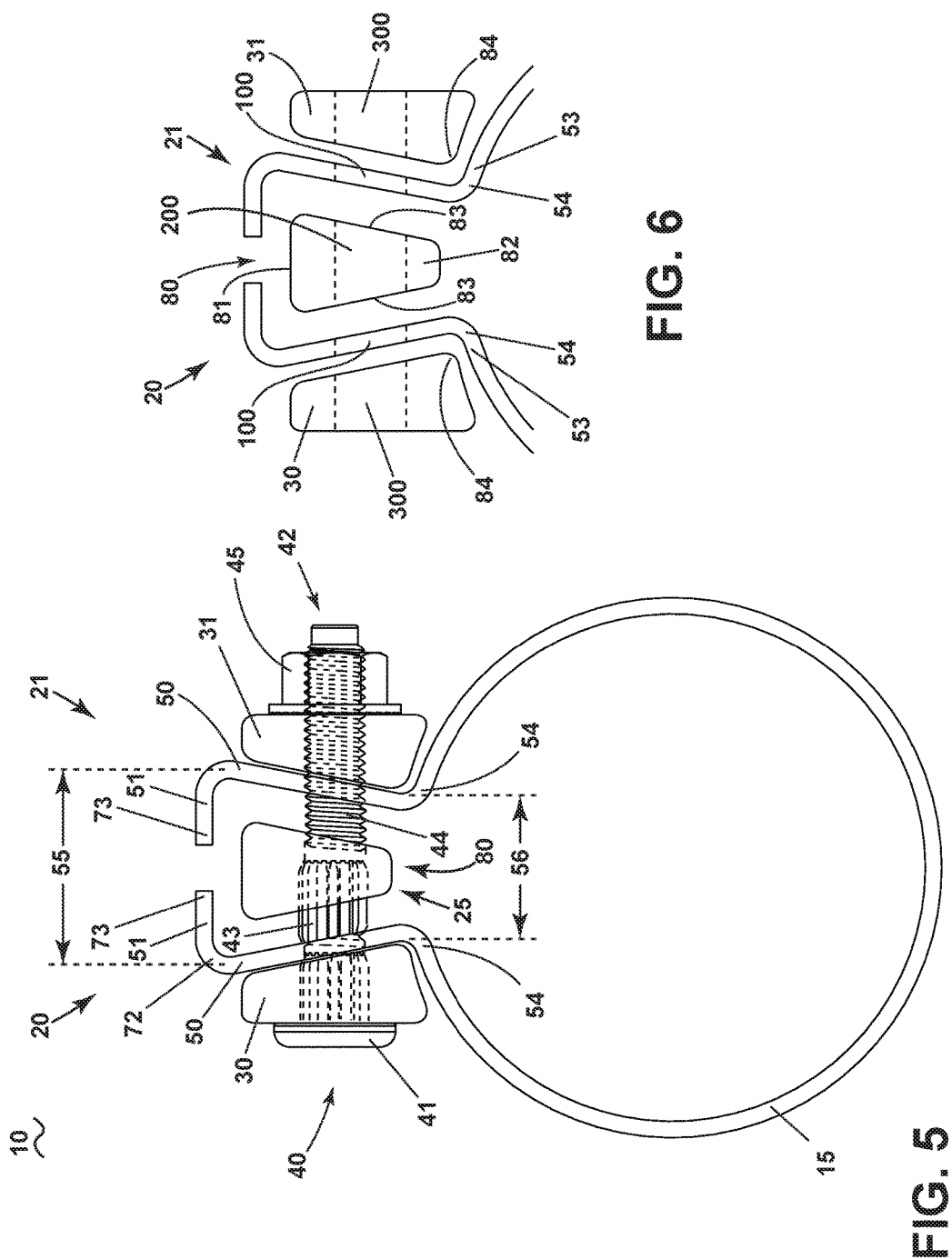
FIG. 6
FIG. 5

US 9,976,678 B2

CLAMP

CROSS-REFERENCE TO RELATED APPLICATION

This application claims the benefit of U.S. Provisional Patent Application No. 62/281,366, filed Jan. 21, 2016, which is incorporated herein by reference in its entirety.

BACKGROUND OF THE INVENTION

The present invention relates to a clamp for use in joining tubular members. Band clamps are commonly used for connecting pipes, hoses, and other tubular members together, such as exhaust pipes of an automotive exhaust system. Such connections may be in a telescopic overlap joint or in an end-to-end butt joint of two tubular members. To be effective, the connection between the tubular members should provide a suitable fluid-tight seal to prevent leakage. The connection should also have a high degree of mechanical strength and be capable of easy disassembly.

BRIEF DESCRIPTION OF THE INVENTION

In one aspect, a clamp for compressing two conduits to seal a junction between them comprises a ring sector, a radially projecting channel sector, a wedge shaped spacer, first and second compression members, a bolt, and a nut. The radially projecting sector can have first and second straps, each of them extending outwardly from the ring sector at an angle defining a pinch point, and defining a proximal gap between the pinch points less than a distal gap between ends of the first and second straps. The wedge shaped spacer can be positioned between the first and second straps. The first and second compression members can be positioned adjacent to and opposite the first and second straps from the wedge shaped spacer and have a portion thereof disposed at a pinch point. Each of the first and second compression members, the first and second straps, and the wedge shaped spacer can have an aperture in registry with each other. The bolt can extend through the apertures and have a head bearing against one of the first and second compression members. The nut can be attached to the bolt and bear against the other of the first and second compression members. When the nut is tightened on the bolt with the ring sector around the outer conduit over junction of the two conduits, the first and second compression members will urge the pinch points toward each other thereby drawing the ring sector around the junction in compression.

BRIEF DESCRIPTION OF THE DRAWINGS

In the drawings:

FIG. 5 is a side view of a clamp in its open state according to a second embodiment of the invention.

FIG. 6 is an exploded side view of a radially projecting channel sector of the clamp of FIG. 5.

DETAILED DESCRIPTION OF THE DRAWINGS

Figure 1:
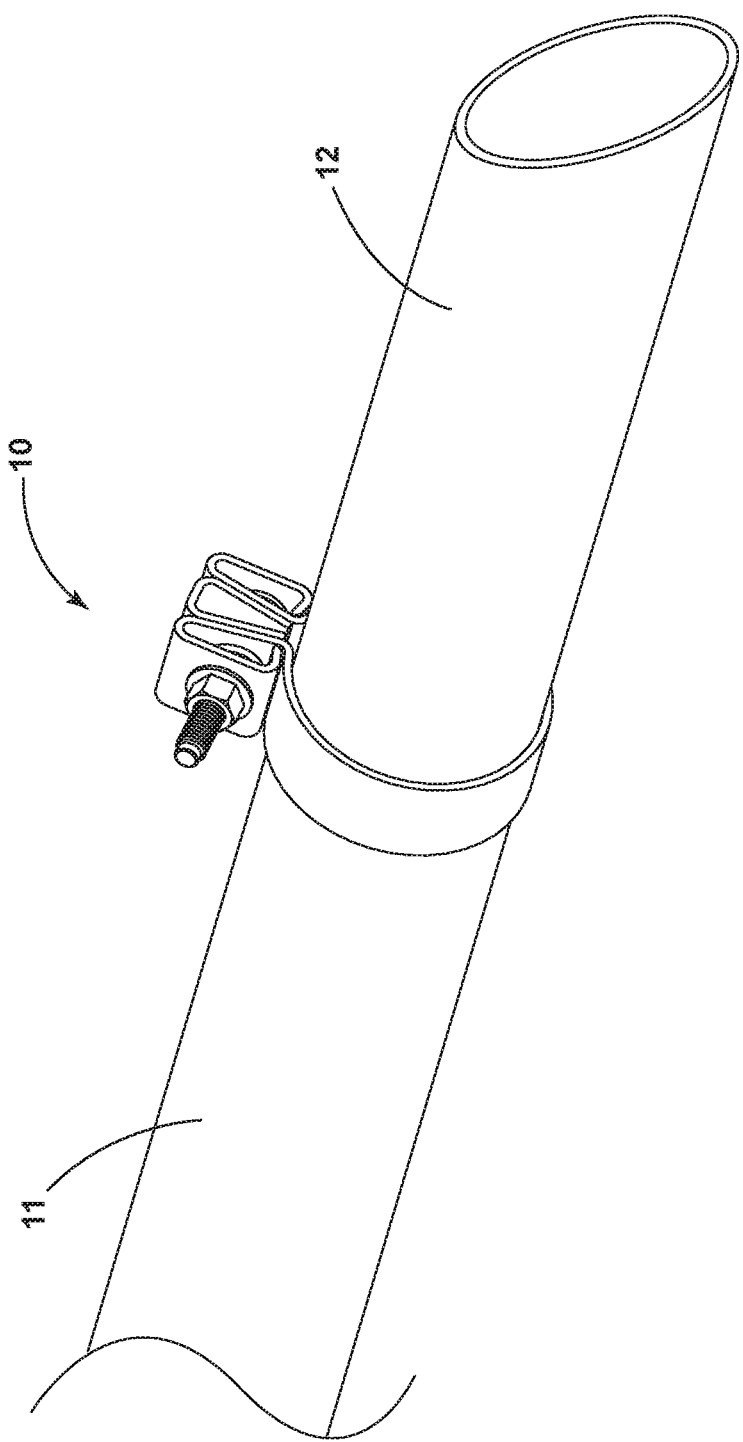
FIG. 1 is an isometric view of a clamp joining two pipes according to a first embodiment of the invention.

In FIG. 1, a first embodiment of a clamp 10 according to the invention may be used to form a joint between a first pipe end 11 and a second pipe end 12. The clamp 10 and pipe ends 11, 12 can comprise a portion of a larger assembly, such as a vehicle exhaust system comprising an exhaust manifold, a muffler, a tailpipe, and other components which are not germane to the invention and are not shown in the drawings. The clamp 10 is seated over the joint between the pipe ends 11, 12. In one example the joint could be a telescopic overlap joint, in which case the first pipe end 11 could be a male pipe end and the second pipe end 12 could be a female pipe end. In another example the pipe ends 11, 12 could be joined using a butt joint.

Figure 2:
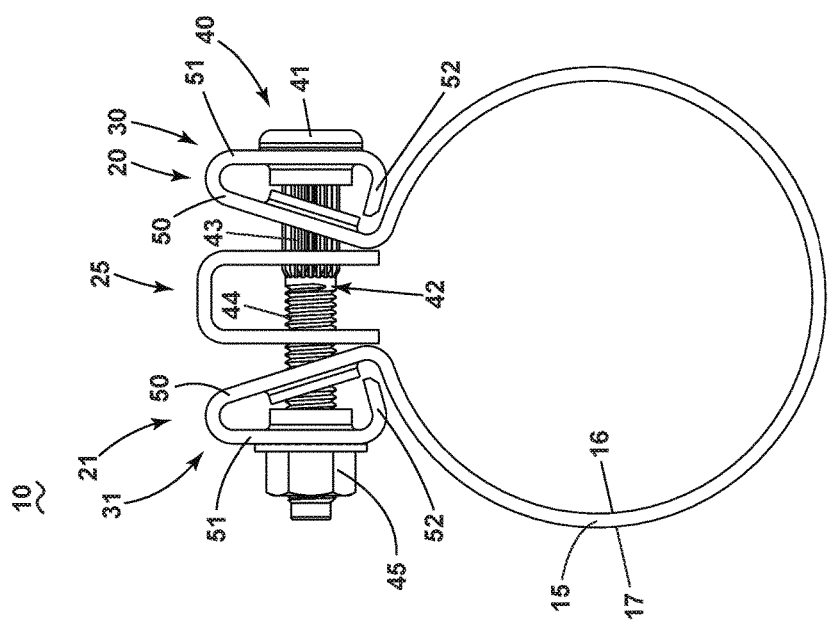
FIG. 2 is a side view of the clamp of FIG. 1 in its open state.

Referring now to FIG. 2, the clamp 10 comprises a ring sector and a radially projecting channel sector. The ring sector comprises a clamp ring 15 having an interior surface 16 and exterior surface 17 while the channel sector comprises a first strap 20, a second strap 21, a wedge shaped spacer 25 positioned between the first and second straps 20, 21, a first compression member 30, a second compression member 31, a bolt 40, and a nut 45. Each of the first and second straps 20, 21 comprises a tab 50 and an ear 51. Each of the first and second compression members 30, 31 can be extensions of the first and second straps 20, 21 formed in a generally triangular shape having three sides wherein an end of a third side forms an abutment end 52 that contacts a first side.

Figure 3:
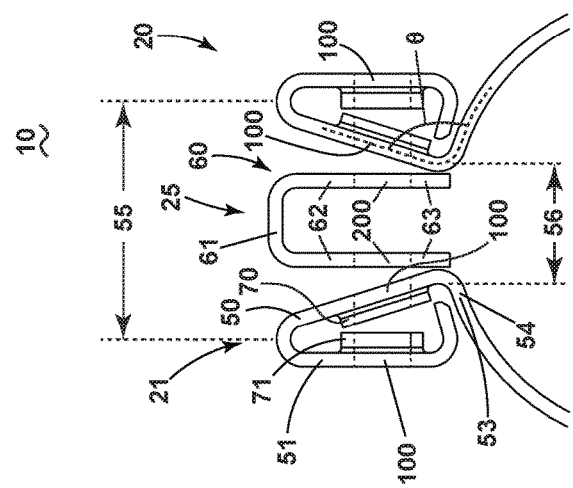
FIG. 3 is a side view of a radially projecting channel sector of the clamp of FIG. 1.

Turning to FIG. 3, the tab 50 of each strap 20, 21 extends outwardly from the clamp ring 15 at an angle θ defining a pinch point 53 at a curved transition 54 between the clamp ring 15 and either of the first or second straps 20, 21. A distal gap 55 is formed between each ear 51, a proximal gap 56 is formed between the two pinch points 53, and the proximal gap 56 is smaller than the distal gap 55. The wedge shaped spacer 25 comprising a U-shaped spring 60 having a web 61, arms 62, and ends 63 is positioned with its ends 63 adjacent the curved transitions 54. Further, apertures 100 in each of the first and second straps 20, 21 are formed with a tab skirt 70 and ear skirt 71 that each begin on the ear 51 or tab 50 and extend into the interior volume bounded by the ear 51 and tab 50. Additional apertures 200 can be formed through the arms 62 of the U-shaped spring, and the apertures 100, 200 can be in registry with each other for the slidable receipt of a fastener such as the bolt 40. The apertures 100, 200 can also be keyed for engagement with the bolt 40.

It can be contemplated that in all embodiments, the bolt 40 comprises a head 41 and a shank 42 having a knurled portion 43 and a threaded portion 44 wherein the knurled portion 43 can contain at least one spline or a plurality of splines along its length, and the splines can be formed in a parallel or cross-hatched pattern as shown in FIG. 2. The diameter of the head 41 is larger than that of the shank 42, and the diameter of the shank 42 is smaller than that of any aperture described herein to allow for the slidable receipt of the bolt 40 through that aperture. It is preferred to make the diameter of the shank 42 as large as possible to allow for engagement between any aperture and either or both of the knurled portion 43 or threaded portion 44 while maintaining the ability of the bolt 40 to slide through that aperture. In addition, the length of the bolt can be greater than the width of the channel sector such that the nut 45 can be threaded onto the threaded portion 44 of the bolt 40 while the clamp 10 is in an open state.

Figure 4:
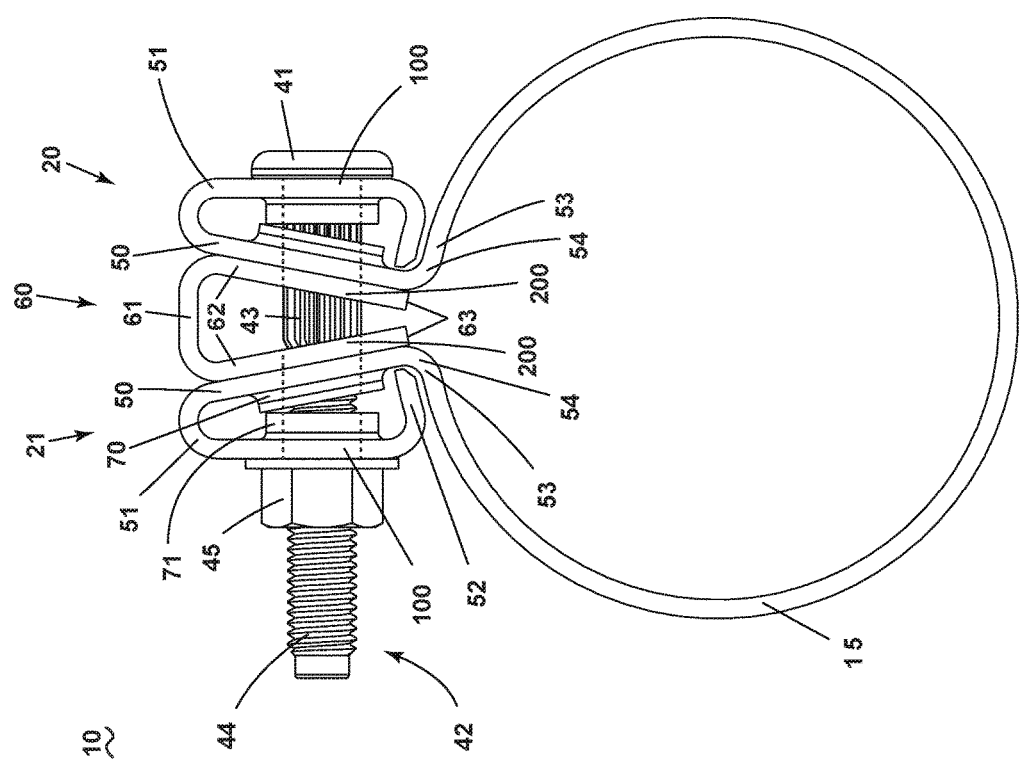
FIG. 4 is a side view of the clamp of FIG. 1 in its closed state.

In order to tighten the clamp 10 of FIG. 2, a relative torque is applied between the nut 45 and the bolt head 41 such that the nut is threaded further onto the bolt 40 as shown in FIG. 4. During the tightening process, the head 41 of the bolt 40 bears against the ear 51 of the first strap 20 while the nut 45 bears against the ear 51 of the second strap 21, causing the tabs 50 to compress the arms 62 of the U-shaped spring 60. In addition, each abutment end 52 can fit into the space between the tab skirt 70 and the clamp ring 15 at the curved transition 54 such that they aid in closing the clamp 10 at the pinch point 53. The knurled portion 43 of the bolt 40 can engage the arms 62 of the U-shaped spring 60 at the apertures 200, and can also engage at least one strap 20, 21 at the apertures 100, in order to prevent spinning between these members during the tightening process.

Once fully tightened, the abutment ends 52 can remain in contact with the curved transitions 54 adjacent the tab skirts 70. In addition, the tab skirt 70 and ear skirt 71 of each strap 20, 21 can come into contact in order to support each strap 20, 21 against collapse. Further, the web 61 of the U-shaped spring 60 can provide additional support for the straps 20, 21 against collapse, and a gap can be maintained between the ends 63 of the U-shaped spring 60.

It should be appreciated that for the purposes of this invention, "fully tightened" or "fully closed" can be understood to mean the clamp 10 has provided a clamping force sufficiently large so as to prevent the second pipe end 12 from moving with respect to the first pipe end 11 as well as to maintain a sealed interior environment such that materials moving through the pipes do not leak out of the pipes' interior volume at their junction.

A second embodiment of the invention is shown in FIGS. 5 and 6. The first strap 20 and second strap 21 each comprise the tab 50 and ear 51 wherein a substantially perpendicular junction 72 exists between the tab 50 and ear 51 at a distal portion of the tab 50, and each ear has an end 73. The wedge shaped spacer 25 comprising a center wedge 80 is positioned between the first strap 20 and second strap 21. The center wedge 80 comprises a distal face 81, proximal face 82, and two lateral faces 83 as shown in FIG. 6. The first and second compression members 30, 31 are positioned adjacent to each of the first and second straps 20, 21. The apertures 100 are formed through each of the first and second straps 20, 21, the aperture 200 is formed through the center wedge, and each of the first and second compression members 30, 31 has an aperture 300 through its width. All apertures 100, 200, 300 can be in registry with each other for the slidable receipt of a fastener such as the bolt 40, and can also be keyed for engagement with the threaded portion 44 or knurled portion 43 of the bolt 40. The bolt 40 is illustrated in FIG. 5 with its head 41 bearing against the first compression member 30. The nut 45 is illustrated in FIG. 5 as being threaded onto the bolt 40 and bearing against the second compression member 31. In addition, a curved transition 54 can exist at the junction of the clamp ring 15 and each tab 50 forming a pinch point 53, where the distal gap 55 is formed between each ear 51, the proximal gap 56 is formed between the two pinch points 53, and the proximal gap 56 is smaller than the distal gap 55. Further, a portion 84 of each compression member 30, 31 can be disposed at each pinch point 53 as shown in FIG. 6.

Figure 7:
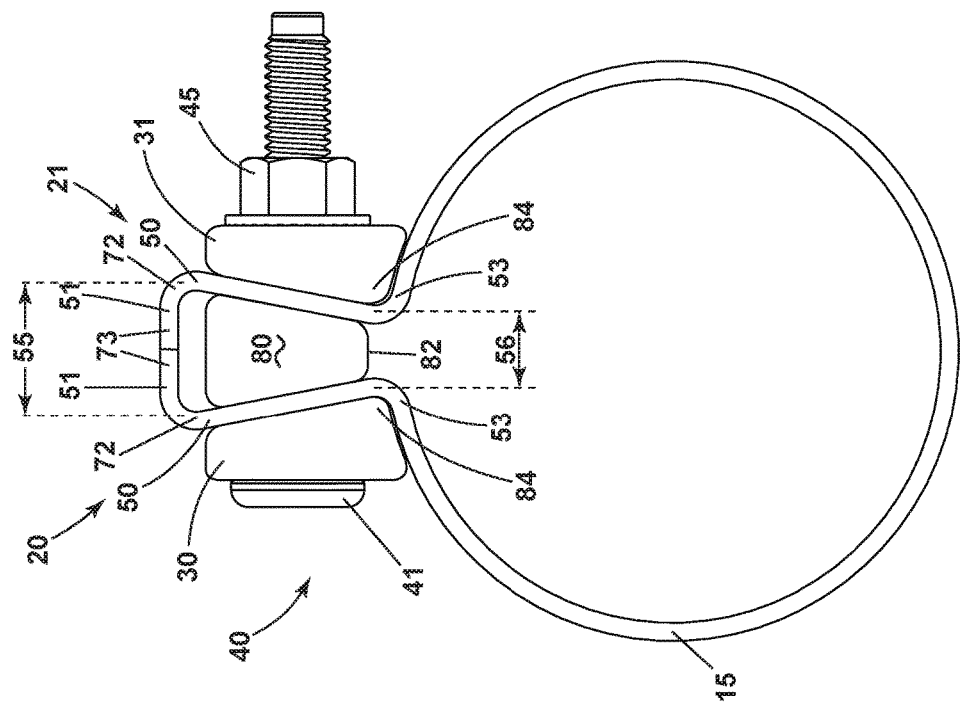
FIG. 7 is a side view of the clamp of FIG. 5 in its closed state.

FIG. 7 shows the clamp 10 of FIG. 5 in a fully closed state. In order to close the clamp 10, a relative torque is applied between the bolt head 41 and the nut 45 such that the nut 45 is further threaded along the bolt 40. During the tightening process, the head of the bolt 40 bears against the first compression member 30 which comes into contact with the first strap 20. At the same time, the nut 45 bears against the second compression member 31 which comes into contact with the second strap 21. Meanwhile, the center wedge 80 comes into contact with both the first strap 20 and the second strap 21. In addition, the portion 84 of each of the first and second compression members 30, 31 can bear against the clamp ring 15 at the pinch point 53 to aid in closing the clamp. Further, the ends 73 of the ears 51 may come into contact, and bending is possible at the junction 72 to allow for continued closing of the clamp 10 after the ends 73 come into contact. Once the clamp 10 is fully closed, the ends 73 may be in contact with each other or there may be a gap between them. Further, the minimum proximal gap 56 can be limited by the width of the proximal face 82 of the center wedge 80, while the minimum distal gap 55 can be limited by the width of the distal face 81 of the center wedge 80.

When compared with the prior art, the embodiment of the invention shown in FIGS. 5-7 is better able to transfer axial forces from the bolt 40 into clamping forces around the ring 15. During the tightening process, the portions 84 of the first and second compression members 30, 31 can bear against the pinch point 53 and aid in closing the clamp 10. As a result, less applied torque is required to bring the clamp 10 into a fully tightened position; in one example, data showed that the second embodiment of the clamp 10 was able to be closed with an applied torque of 30 N·m compared to a closing torque of 74 N·m for a prior art clamp. In addition, lowering the amount of applied torque can reduce the chance of a material failure occurring in the bolt 40, and this could allow for the use of less expensive materials in constructing the bolt 40. Once the clamp 10 is fully tightened, the portions 84 of the first and second compression members 30, 31 can reinforce the curved transition 54 and help concentrate clamping forces near the pipe surface.

Figure 8:
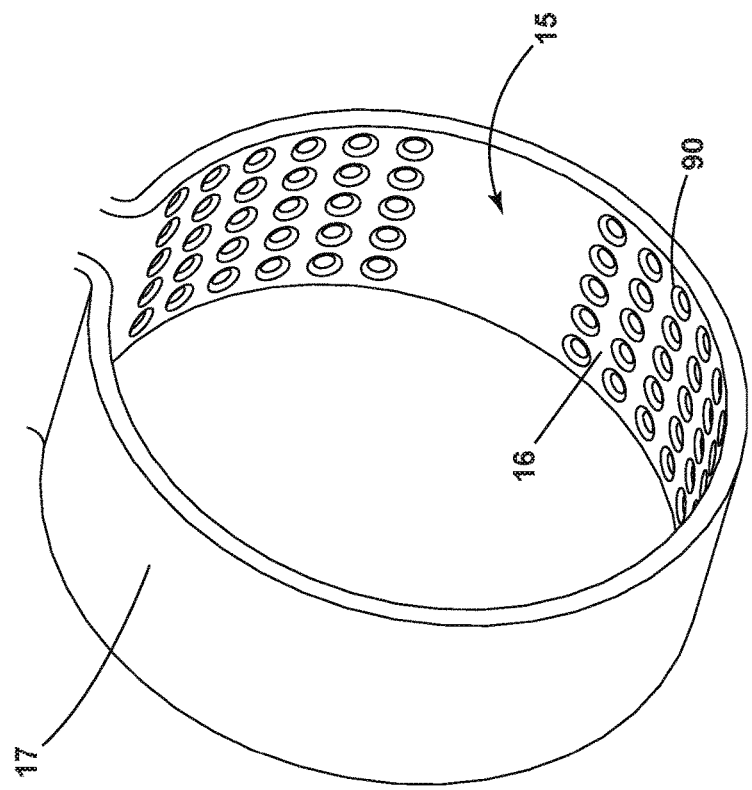
FIG. 8 is an isometric view of a clamp according to a third embodiment of the invention.

FIG. 8 shows a third embodiment of the invention wherein the clamp ring 15 having an interior surface 16 and exterior surface 17 can have at least one dimple 90 formed into the interior surface 16. It is also contemplated that a group of dimples 90 can uniformly cover a portion or all of the interior surface 16 of the ring 15.

Figure 9A:
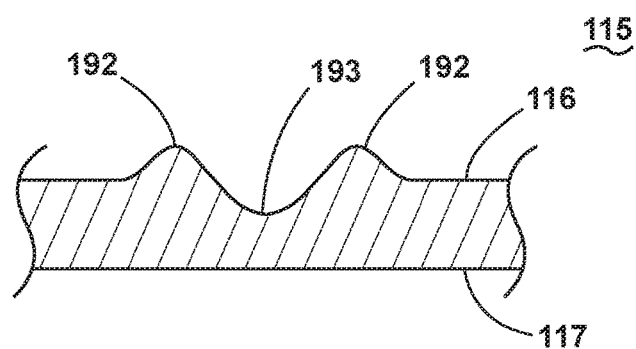
FIGS. 9A-9D are partial cross-sectional side views of a clamp ring in the clamp of FIG. 8.
Figure 9B:
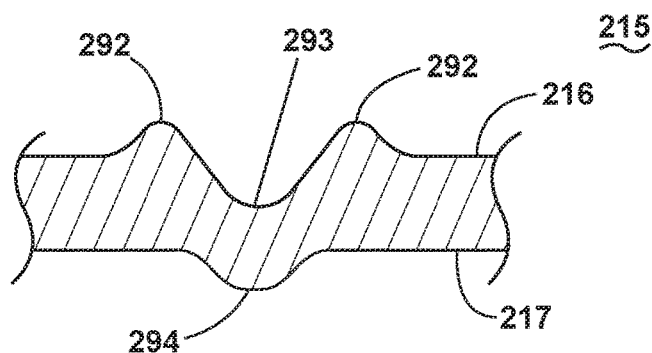
Figure 9C:
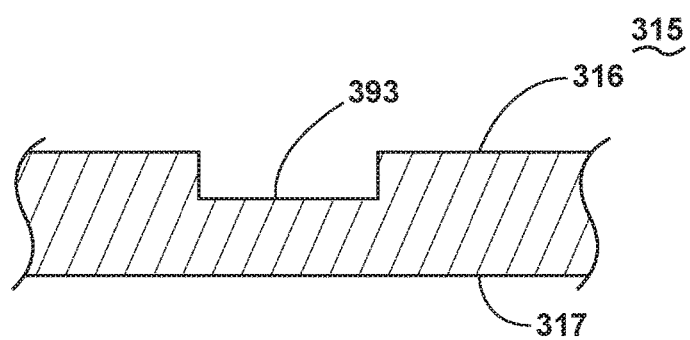
Figure 9D:
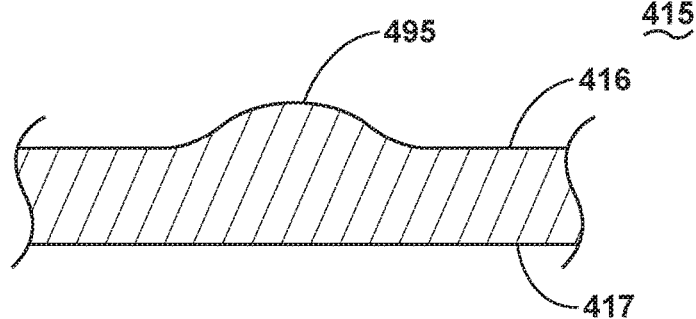

FIGS. 9A-9D illustrate possible options for the dimples 90 in the clamp ring 15 illustrated in FIG. 8. Aspects of the clamp ring 15, the interior surface 16, and exterior surface 17 are similar to aforementioned descriptions; therefore, like parts will be identified with like numerals increased by 100, 200, 300, or 400, with it being understood that the description of the like parts of aforementioned components 15, 16, 17 applies unless otherwise noted. The dimple may extend into the interior clamp surface 116 creating a central low point 193 as shown in FIG. 9A. There may be an annular portion 192 that is taller than the interior surface 116 and surrounds the central low point 193 as shown in FIG. 9A. There may be an annular portion 292 that is taller than the interior surface 216 and surrounds the central low point 293 as shown in 9B, and the dimple 90 may have a protrusion 294 extending out of the exterior clamp surface 217. The central low point 393 can also be a flat surface parallel to the interior surface 316 and extending the full width of the dimple 90, as shown in FIG. 9C. The dimple 90 may also be formed as a central high point 395 extending out of the interior clamp surface 316 as shown in FIG. 9D.

The dimples 90 shown in FIGS. 8 and 9A-9D can have the effect of reducing the surface area of the clamp ring 15, 115, 215, 315, 415 in contact with the second pipe end 12. The reduced surface area contact could cause a reduction in frictional forces between the interior clamp ring surface 16, 116, 216, 316, 416 and the second pipe end 12; with less friction between these members, the applied torque required to fully tighten the clamp 10 can be further reduced. In addition, the dimples 90 can be formed in the clamp ring 15, 115, 216, 316, 416 of any embodiment in the current invention, or in any clamp in the prior art having a ring sector.

For all embodiments described herein, it should be understood that the nut 45 and bolt 40 can bear against either of the first or second compression members 30, 31. It is also contemplated that any or all of the first and second compression members 30, 31, the center wedge 80, and the U-shaped spring 60 can be formed of an incompressible material such as steel. Further, while the clamp 10 is shown as generally circular in cross-section, other cross-sectional geometries can be contemplated.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A clamp for compressing a junction of a first conduit and a second conduit to seal the junction, the clamp comprising:
   a ring sector and a radially projecting channel sector;
   the radially projecting channel sector having a first strap having a first inner surface and a second straps having a second inner surface, the first and second inner surfaces facing each other, and each of the first and second straps extending outwardly from the ring sector at an angle defining a pinch point at a curved transition between the ring sector and each of the first and second straps, and defining a proximal gap between the pinch points between the first inner surface and the second inner surface at the curved transition less than a distal gap between the first inner surface and the second inner surface at an outermost distal end of the radially projecting channel sector;
   a wedge shaped spacer being formed in a U-shape between the first and second straps;
   first and second compression members adjacent to and opposite the first and second straps from the wedge shaped spacer and having a portion thereof disposed at a pinch point;
   each of the first and second compression members, the first and second straps, and the wedge shaped spacer having an aperture in registry with each other;
   a bolt extending through the apertures and having a head bearing against one of the first and second compression members; and
   a nut on the bolt and bearing against the other of the first and second compression members;
   wherein when the nut is tightened on the bolt with the ring sector around a junction of a first outer conduit and a second conduit, the first and second compression members will urge the pinch points toward each other thereby drawing the ring sector around the first and second conduits in compression.

2. The clamp of claim 1 wherein each of the first and second compression members is a wedge that bears against the pinch point.

3. The clamp of claim 2 wherein the wedges are formed of an incompressible material.

4. The clamp of claim 3 wherein the incompressible material is steel.

5. The clamp of claim 1 wherein the each of the first and second compression members is an extension of the respective first and second straps.

6. The clamp of claim 5 wherein each extension includes a first skirt and second skirt.

7. The clamp of claim 5 wherein each extension has an abutment end that bears against the pinch point.

8. The clamp of claim 1 wherein the wedge shaped spacer is formed of an incompressible material.

9. The clamp of claim 8 wherein the incompressible material is steel.

10. The clamp of claim 1 wherein the wedge shaped spacer is formed of a U shaped spring.

11. The clamp of claim 10 wherein the U shaped spring includes spaced arms connected by a web wherein each of the spaced arms has an aperture in registry with the other apertures to receive the bolt, and wherein the web is disposed opposite the bolt from the proximal gap and the spaced arms bear against the first and second straps.

12. The clamp of claim 11 wherein when the nut is tightened on the bolt, the first and second compression members will urge the spaced arms toward each other.

13. The clamp of claim 1 wherein the bolt is keyed in the apertures.

14. The clamp of claim 1 further comprising dimples on an inside surface of the ring sector.

15. The clamp of claim 1 wherein when the nut is tightened on the bolt, the first and second compression members will urge first and second inner surfaces toward each other thereby drawing the ring sector around the first and second conduits in compression.

16. A clamp for compressing a junction of a first conduit and a second conduit to seal the junction, the clamp comprising:
   a ring sector and a radially projecting channel sector;
   the radially projecting channel sector having first and second straps, each of the first and second straps extending outwardly from the ring sector at an angle defining a pinch point, and defining a proximal gap between the pinch points less than a distal gap between ends of the first and second straps;
   a wedge shaped spacer in the form of a U shaped spring between the first and second straps, the U shaped spring including spaced arms connected by a web;
   first and second compression members adjacent to and opposite the first and second straps from the wedge shaped spacer and having a portion thereof disposed at a pinch point;
   each of the first and second compression members, the first and second straps, and the wedge shaped spacer having an aperture in registry with each other;
   a bolt extending through the apertures and having a head bearing against one of the first and second compression members; and
   a nut on the bolt and bearing against the other of the first and second compression members;
   wherein each of the spaced arms of the U shaped spring has an aperture in registry with the other apertures to receive the bolt, and wherein the web is disposed opposite the bolt from the proximal gap and the spaced arms bear against the first and second straps, and when the nut is tightened on the bolt with the ring sector around a junction of a first outer conduit and a second conduit, the first and second compression members will urge the pinch points and the spaced arms toward each other thereby drawing the ring sector around the first and second conduits in compression.

\* \* \* \* \*